United States Patent [19]

Wolf

[11] 3,723,917

[45] Mar. 27, 1973

[54] CIRCUIT ARRANGEMENT FOR RECEIVING HIGH-FREQUENCY ELECTRIC SIGNALS

[75] Inventor: Gerrit Wolf, Nijmegen, Netherlands

[73] Assignee: U.S. Philips Corporation, New York, N.Y.

[22] Filed: Apr. 5, 1971

[21] Appl. No.: 131,483

Related U.S. Application Data

[63] Continuation of Ser. No. 771,549, Oct. 29, 1972, abandoned.

[30] Foreign Application Priority Data

Nov. 25, 1967 Netherlands ........................6716071

[52] U.S. Cl. .......................................333/32, 333/70

[51] Int. Cl. ...............................................H03h 7/38

[58] Field of Search .......333/32, 33, 17, 17 A, 70, 76

[56] References Cited

UNITED STATES PATENTS 2,092,709 9/1937 Wheeler ..........................343/850 X

FOREIGN PATENTS OR APPLICATIONS 717,544 2/1942 Germany .............................343/860

OTHER PUBLICATIONS

Sheffield, Filter Design Simplified (Part I) in Audio Engineering, March 1951; pp. 13–14 and 34–36.
Sheffield, Filter Design Simplified (Part II) in Audio Engineering, May 1951; pp. 26, 28, and 58.

*Primary Examiner*—Herman Karl Saalbach
*Assistant Examiner*—Marvin Nussbaum
*Attorney*—Frank R. Trifari

[57] ABSTRACT

A circuit which steps up a substantially pure antenna resistance to a high value which is constant across a wide frequency band. The circuit features a parallel resonant circuit coupled to the antenna and fixed tuned to a frequency at one of the band limits. A series reactance couples the fixed tuned circuit to a circuit which is tunable across the band and is the input of an R.F. amplifier.

7 Claims, 5 Drawing Figures

Figure 1:
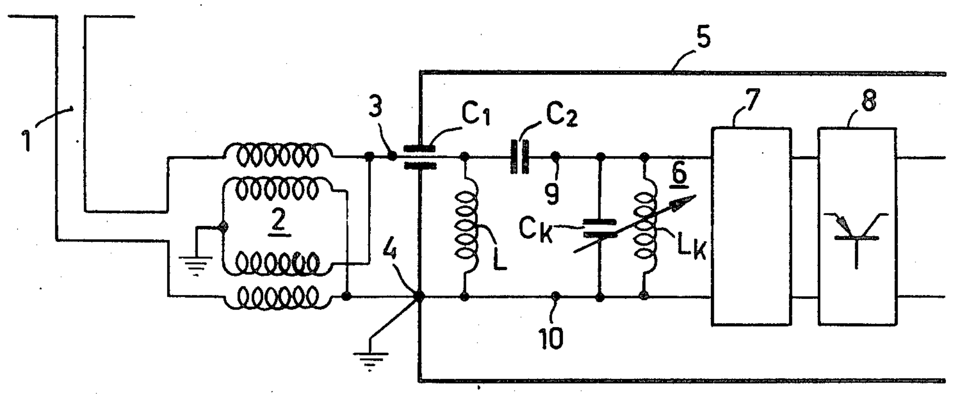

INVENTOR.
GERRIT WOLF

BY

AGENT

GERRIT WOLF INVENTOR.

BY

[signature]

AGENT

CIRCUIT ARRANGEMENT FOR RECEIVING HIGH-FREQUENCY ELECTRIC SIGNALS

This is a continuation of application Ser. No. 771,549 filed Oct. 29, 1972, now abandoned.

The invention relates to a circuit arrangement for receiving high-frequency electric signals, for example VHF television signals, lying within a given frequency range, which circuit arrangement includes a tunable parallel resonant circuit and terminals for the connection of a substantially resistive impedance, for example a signal source having a substantially resistive impedance, while between these terminals and the resonant circuit is arranged a transformation network which steps up the said substantially resistive impedance towards the tunable parallel resonant circuit.

In many cases, a substantially resistive impedance of a given value, for example, an aerial supply lead or the input terminals of a transistor, should be connected to a tunable resonant circuit. This impedance then influences the operation of the tunable resonant circuit and any further elements connected to the resonant circuit.

It is often desirable, for example, that a maximum signal transmission should take place between the said impedance and the resonant circuit (power matching); as is known, the power transfer between a signal source and a resonant circuit and between a resonant circuit and a load depends upon the value of the internal resistance of the signal source and of the load, respectively.

If a tunable resonant circuit is connected on the one hand to an aerial and on the other hand to an amplifier stage, for example, a transistor amplifier, the value of the aerial resistance connected to the circuit influences the noise properties of the transistor. Therefore, it is often desirable for the aerial and/or the transistor to be connected to the circuit so that the signal-to-noise ratio of the circuit arrangement is to the optimum.

The value of a substantially resistive impedance connected to a tunable resonant circuit also influences the width of the pass-band of the circuit. In general, it is desirable for the width of the pass-band of the resonant circuit to be approximately the same over the entire timing range of the resonant circuit.

In order to solve such problems, it is of common knowledge to connect the said impedance to the tunable resonant circuit through a transformation network by means of which the said impedance is stepped up to the desired value towards the resonant circuit. For comparatively low frequences, for example, of up to approximately 10 Mc/s, use may be made of magnetically coupled windings which are wound on a core of ferromagnetic material. For higher frequences, this method is unsuitable, however, owing to the high signal losses occurring in the ferromagnetic material. Known transformation networks for higher frequencies have the disadvantage, however, that the extent to which they step up the impedance is strongly frequency-dependent, while it is often desirable for the transformation to be as frequency-independent as possible; this is important, for example, in resonant circuits in which the tuning and/or the range commutation is effected by varying the inductance of the circuit so that the width of the pass-band of such a circuit is kept as constant as possible throughout the frequency range. Transformation networks having magnetically coupled windings without a core of ferromagnetic material cannot be used at high frequencies to achieve a constant transformation in a large frequency range, since both the stray inductances and the magnetization inductance, which will then inevitably occur, adversely affect the transformation.

From U.S. Pat. application Ser. No. 605,486, filed Dec. 28, 1966, now U.S. Pat. No. 3,518,565, a circuit arrangement for receiving VHF television signals is known in which the aerial is connected to a tunable resonant circuit through a series reactance comprising the parallel-combination of an inductance and a capacitance. The inductance is then used for the transformation of the aerial resistance in the lower frequency band (VHF band I) of the frequency range and the capacitance for the transformation of the aerial resistance in the higher frequency band (VHF band III). By this step, it is achieved that the aerial resistance is stepped up for the center of the lower frequency band approximately to the same extent as for the center of the higher frequency band. Within each frequency band, the transformation of the aerial resistance is strongly frequency-dependent, however.

The invention has for an object to provide a circuit arrangement which can be obtained in a very simple manner and in which the substantially resistive impedance to be connected through the transformation network to the resonant circuit is stepped up towards the resonant circuit to an extent which is substantially constant through a large frequency range; according to the invention, this circuit arrangement is characterized in that the transformation network comprises a series reactance connected between one of the said terminals and the tunable parallel resonant circuit and a first parallel reactance which is connected in parallel with the said terminals and which is of the same sense of the series reactance and of smaller value than the latter, and a second parallel reactance of a sense opposite to that of the series reactance which is connected in parallel with the said terminals, while the second parallel reactance is large when compared with the first parallel reactance for one end of the frequency range and is approximately equal to this first parallel reactance but of opposite sense for the other end of the frequency range, the quotient between the inductance of one of the two parallel reactances and the capacitance of the other parallel reactance being of the order of twice the square of the substantially ohmic impedance to be stepped up.

Figure 2A:
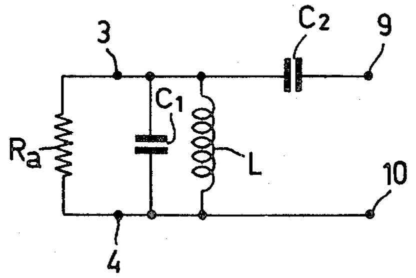
Figure 2B:
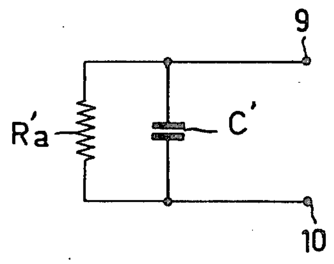
Figure 4:
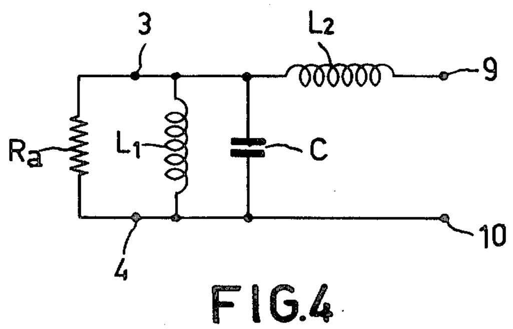
Figure 3:
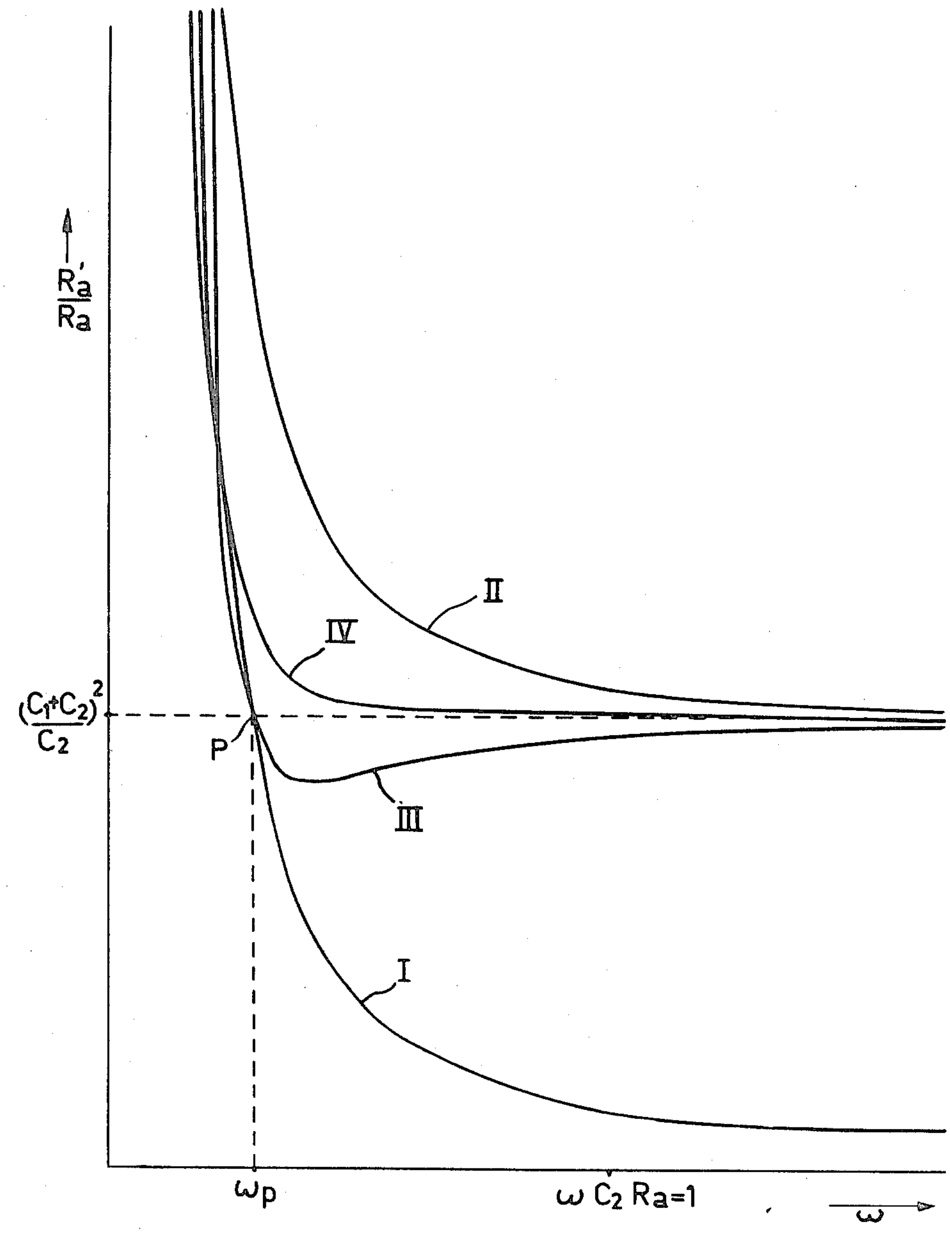

The invention will now be described more fully with reference to the Figures shown in the drawing, of which:

FIG. 1 shows a first embodiment of a circuit arrangement according to the invention, FIGS. 2*a* and 2*b* show equivalent circuit diagrams for the explanation of the operation of the circuit arrangement of FIG. 1, FIG. 3 shows circuit diagrams for the explanation of the operation of the circuit arrangement of FIG. 1, and FIG. 4 shows the equivalent circuit diagram of a second embodiment of a circuit arrangement according to the invention.

Referring now to FIG. 1, reference numeral 1 denotes an aerial which is connected through a known so-called balancing or balun transformer 2 to input terminals 3 and 4 of a tuning device. The balancing transformer 2 serves to connect the aerial supply lead arranged symmetrically to ground to the input terminals 3 and 4, one of which (4) is connected to ground. With the use of an aerial supply lead one end of which is already grounded, the balancing transformer 2 may be omitted. The turning device (shown only in part) is surrounded by a grounded metal screening 5 (also shown only in part). The input terminal 3 is constituted by the inner conductor of a feedthrough capacitor $C_1$ disposed in the screening 5. This feedthrough capacitor is connected in parallel across the input terminals 3 and 4. An inductance L is also connected in parallel across the input terminals 3 and 4, while the signals are supplied from the input terminal 3 through a series capacitor $C_2$ to a tunable resonant circuit 6 connected to two terminals 9 and 10. The resonant circuit 6, which comprises the parallel-combination of a capacitor $C_k$ and an inductance $L_k$, is used to select a given channel from the signals lying in a large frequency range, for example, from the VHF television bands I and III. The signal thus selected by the resonant circuit 6 is applied, if desired through a coupling network 7 (shown diagrammatically), to an amplifier stage or mixer stage 8 (also shown diagrammatically).

The transformation network comprising the capacitors $C_1$ and $C_2$ and the inductance L between the input terminals 3 and 4 on the one hand and the terminals 9 and 10 on the other hand serves to step up the substantially resistive aerial resistance appearing at the terminals 3 and 4 so that the stepped up aerial resistance appearing across the resonant circuit is substantially frequency-independent throughout the frequency range to which the resonant circuit 6 can be tuned.

In order to illustrate the operation of the transformation network $C_1$, $C_2$, L, FIG. 2a shows this network and the equivalent aerial resistance $R_a$ connected to the input terminals 3 and 4. FIG. 2b shows the equivalent impedance between the terminals 9 and 10 formed by the elements $R_a$, $C_1$, $C_2$ and L. This equivalent impedance is represented by the parallel-combination of a resistance $R'_a$ and a reactance constituted by a capacitor $C'$. For explanation it is assumed that the circuit diagram of FIG. 2a does not include the capacitor $C_1$ and the inductance L. The impedance between the terminals 9 and 10, viewed in the direction of the aerial, is then equal to $R_a + (1/j\omega C_2)$, where $\omega$ represents the angular frequency of the signal and $j = \sqrt{-1}$. This impedance corresponds to an admittance $(j\omega C_2/1+j\omega C_2 R_a) = (j\omega C_2 + \omega^2 C_2^2 R_a/1+^2 C_2^2 R_a^2)$ and it thus consists of a real part (conductance) $1/R_a' = (\omega^2 C_2^2 R_a/1+\omega^2 C_2^2 R_a^2)$ and an imaginary part (susceptance) $j\omega C' = j\omega C_2/1 + \omega^2 C_2^2 R_a^2$. The impedance between terminals 9 and 10, viewed in the direction of the aerial, may therefore be represented by the parallel-combination of a resistance $R_a' = (\omega^2 C_2^2 R_a^2 + 1/\omega^2 C_2^2 R_a)$ and a capacitance $C' = (C_a/1+\omega^2 C_2^2 R_a^2)$. The capacitance $C'$ is operative in parallel with the resonant circuit 6 and also determines the tuning frequency of this circuit. $R_a'$ is the transformed aerial resistance and it therefore holds for the transformation ratio $R_a'/R_a$ that $R_a'/R_a = (\omega^2 C_2^2 R_a^2 + 1/\omega^2 C_2^2 R_a^2) = 1 + (1/\omega^2 C_2^2 R_a^2)$.

In FIG. 3, the curve I represents the transformation ratio $R_a'/R_a$ as a function of the angular frequency $\omega$. It appears from this Figure that for high frequencies, in this case for frequencies at which $\omega C_2 R_a$ is considerably larger than 1, the curve I has a substantially flat course, that is to say that the transformation ratio $R_a'/R_a$ is substantially frequency-independent. In this frequency range, however, the transformation ratio is approximately equal to 1 so that $R_a' \approx R_a$; the aerial resistance is thus not stepped up. For lower frequencies, more particularly for those frequencies at which $\omega C_2 R_a < 1$, $(R_a'/R_a)$ is considerably larger than 1 so that for these frequencies the aerial resistance is indeed stepped up. For these frequencies, the transformation ratio $R_a'/R_a$ and hence also the stepped-up aerial resistance $R_a'$ are strongly frequency-dependent, however.

It is further assumed that the network of FIG. 2*a* includes the two capacitors $C_1$ and $C_2$ and that only the inductance L is omitted. For this network, the transformation ratio $R_a'/R_a$ for the aerial resistance can be plotted as a function of the frequency in the same manner as described above and it is found, that it now holds for this transformation ratio that: $R_a'/R_a = (C_1 + C_2)^2, c_2) + (1/\omega^2 C_2^2 R_a^2)$. This relation is represented by the curve II in FIG. 3. It appears from this curve that the transformation ratio $R_a'/R_a$ is still strongly frequency-dependent for the lower frequencies, but that for the higher frequencies, for which it holds that $\omega C_2 R_a >> 1$, the aerial resistance is stepped up in a substantially frequency-independent manner in accordance with $R_a'/R_a \approx (C_1 + C_2)^2/(C_2)$.

It is disadvantageous, however, that throughout the desired frequency range the condition $\omega C_2 R_a >> 1$ can be satisfied, and therefore the required transformation ratio $(C_1+C_2)^2/(C_2)$ can be obtained, only if the capacitors $C_2$ and $C_1$, respectively, are chosen to be so large that the stray inductances of these capacitances may have a disturbing effect on the transformation of the aerial resistance.

In order to obviate this advantage, the embodiment of the circuit arrangement according to the invention shown in FIGS. 1 and 2 includes an inductance L connected in parallel with the capacitor $C_1$. For the high-frequency end of the frequency range, the impedance of the inductance L is large when compared with that of the capacitor $C_1$ and for these frequencies the inductance is thus inoperative. Therefore, the transformation is effected only by the capacitors $C_1$ and $C_2$ in accordance with the relation defined above: $R_a'/R_a = (C_1+C_2)^2/(C_2)$. The inductance L is further assumed to be so large that for that frequency $\omega_p$ at which the impedance of the inductance is equal to the impedance of capacitor $C_1$ but of opposite sense, the transformation ratio only with the use of the capacitor $C_2$ is approximately equal to the transformation ratio $(C_1+C_2)^2/(C_2)$ for the higher frequencies with the use of the capacitors $C_1$ and $C_2$. For this frequency $\omega_p$, the parallel-combination of capacitor $C_1$ and inductance L has a very high resistance (parallel resonance) so that at this frequency, only the capacitor $C_2$ is operative for the transformation of the aerial resistance. The curve III, which represents with this proportioning of the inductance L the course of the transformation ratio $R_a'/R_a$ as a function of the frequency for the network L, $C_1$, $C_2$, is then for the higher frequencies, at which the inductance L is practically inoperative, substantially equal to $(C_1+C_2)^2/(C_2)$, while on the other hand this curve passes through the point P of the curve I indicated in FIG. 3 at which the transformation ratio is also equal to $(C_1+C_2)^2/(C_2)$. Thus, a substantially frequency-independent course of the transformation ratio $R_a'/R_a$ is obtained over a frequency range which is considerably enlarged towards the lower frequencies.

For the frequency $\omega_p$, it holds that $\omega_p = 1/\sqrt{LC_1}$. Since the point P is located on the curve I and it further holds for this point that $R_a'/R_a = (C_1+C_2)^2/((C_2))$, it further follows that: $(C_1+C_2)^2/(C_2) = 1+(1/\omega_p{}^2C_2{}^2R_a{}^2$. By elimination of $\omega_p$, it is found that: $(C_1+C_2)^2/(C_2) = 1 + (LC_1/C_2{}^2R_a{}^2)$. From this it follows that $L = R_a{}^2(C_1 + 2C_2)$, which is therefore the value of the inductance L at which the transformation ratio $R_a'/R_a$ has the course represented by the curve III.

A slightly different proportioning of the inductance L is found in the following manner. If the transformation ratio $R_a'/R_a$ of the network of FIG. 2*a* is determined, it is found that: $R_a'/R_a = (C_1 + C_2)^2/(C_2) + (1/\omega^a\Xi_2{}^2R_a{}^2) - 2(C_1 + C_2/\omega^2LC_2{}^2) + (1/\omega^4L^2C_2{}^2)$. Since the fourth term assumes high values only for very low frequencies, a transformation ratio can be obtained which is substantially frequency-independent over a large frequency range if the second and the third terms of the above equation cancel each other. It then holds that: $(1/\omega^2C_2{}^2R_a{}^2) = 2(C_1+C_2/\omega^2LC_2{}^2)$ or $L = 2(C_1+C_2)R_a{}^2$.

For this proportioning of the inductance L, the course of the transformation ratio as a function of the frequency is represented by the curve IV in FIG. 3. Whereas the curve III, which applies to $L = R_a{}^2(C_1 + 2C_2)$ still exhibits a small sagging, this sagging has completely disappeared in the curve IV, which applies to a slightly higher value of L, i.e., $L = R_a{}^2(2C_1 + 2C_2)$. The optimum proportioning of the inductance L lies at a value between the two aforementioned values. Since $C_2$ is smaller than $C_1$, this optimum value lies approximately at $L = 2C_1R_a{}^2$, and therefore at a value such that the quotient $L/C_1$ between the inductance L and the capacitance of capacitor $C_1$ is equal to twice the square of the aerial resistance $R_a$ to the stepped up. In practice, the deviation from this optimum proportioning will preferably not exceed a factor 2.

As appears from curves III and IV of FIG. 3, the frequency range in which the transformation ratio $R_a'/R$is substantially frequency-independent extends from the higher frequencies down to approximately the frequency $\omega_p$ at which the impedance of the inductance L is equal to that of the capacitance $C_1$ but of opposite sense. The product of the capacitance $C_1$ and the inductance L is therefore chosen so that these two reactances are equal but of opposite sense for a frequency lying in the vicinity of the low-frequency end of the frequency range.

In a practical embodiment of a circuit arrangement, in which the aerial resistance $R_a$ to be stepped up was equal to 75 Ω, $C_1$ was chosen to be equal to 33 pF, $C_2$ equal to 12 pF and L equal to 0.37 μH. The frequency range for which this circuit arrangement was designed extended from 50 Mc/s to 230 Mc/s.

As shown in FIG. 2*b*, the network $R_a$, $C_1$, L, $C_2$ produces between the terminals 9 and 10 a capacitance C' operative in parallel with the stepped-up aerial resistance $R_a'$. This capacitance forms part of the tuning capacitance of the resonant circuit. An important advantage of the circuit arrangement according to the invention is that this capacitance c' does not assume high values, which would give rise to difficulties in proportioning the resonant circuit. It can be shown that the capacitance C' does not exceed the capacitance $C_2$ throughout the frequency range in which the circuit arrangement is operative.

In certain cases, for example, with a fully inductively tuned resonant circuit 6, which moreover requires only a small tuning capacitance, this tuning capacitance can be completely supplied by the capacitance C' originating from the transformation network. In such a circuit arrangement, the capacitor $C_k$ shown in FIG. 1 is therefore dispensed with.

On the other hand, when the resonant circuit itself includes a capacitor $C_k$, the delta arrangement formed by the capacitors $C_1$, $C_2$ and $C_k$ may naturally be replaced in known manner by an equivalent star arrangement of capacitors.

Since the capacitor $C_1$ is connected in parallel with the inductance L, the stray capacitance of this inductance cannot adversely affect the transformation of the aerial resistance. The capacitors $C_1$ and $C_2$, however, have stray inductances which operate in series with the capacitors and the most disturbing among these stray inductances is the stray inductance associated with the largest capacitor, especially for the highest frequencies of the frequency range to be covered. An important advantage of the circuit arrangement of FIG. 1 is that the largest capacitor ($C_1$) can be constructed as a feedthrough capacitor so that, as is known, the stray inductance operating in series with the capacitance of this capacitor is considerably reduced.

It should be noted that in the circuit diagram of FIG. 2*a*, the capacitor $C_1$ may be replaced by an inductance $L_1$, the capacitor $C_2$ by an inductance $L_2$ and the inductance L by a capacitor C. Such an alternative circuit arrangement is shown in FIG. 4. The value of the capacitance C is then chosen so that the quotient between the inductance $L_1$ and the capacitance C is of the order of $2R_a{}^2$. The product of $L_1$ and C is chosen so that the impedance of $L_1$ is equal to that of C but of opposite sense for a frequency lying at the high end of the desired frequency range. The transformation ratio is then substantially frequency-independent throughout the frequency range extending from low frequencies at which $\omega L_a << R_a$ to approximately the aforesaid frequency at which the impedance of $L_1$ is equal to that of C but of opposite sense. The transformation ratio $R_a'/R_a$ obtained with this circuit arrangement is approximately equal to $(L_1 + L_2)^2/(L_1)$. In this circuit arrangement, the capacitor C may be a feedthrough capacitor.

In the circuit arrangement shown, the signals of the substantially real impedance to be transformed (the aerial) are applied through the transformation network to the tunable resonant circuit. The circuit arrangement according to the invention may of course also be used in those cases in which the signals are applied from the tunable resonant circuit through the transformation network to the impedance to be transformed, for example, the input terminals of a transistor.

What is claimed is:

1. A circuit for transforming a substantially resistive input load to match an output load throughout a frequency range having selected upper and lower frequency limits said circuit comprising input and output ports for receiving said input and output loads respectively; a resonant circuit parallel coupled to said input port including a fixed inductor and a fixed capacitor parallel coupled to said inductor, said resonant circuit having a fixed resonant frequency approximately equal to one of said frequency limits, the quotient of said inductance to said capacitance being less then 4 times the square of the value of the resistance of said resistive input load and more than said value; and a series fixed reactance element coupled between said ports having a reactance greater than the reactance of the same kind in said resonant circuit.

2. A circuit as claimed in claim 1 wherein said series reactance element comprises a capacitor and said resonant frequency is approximately equal to said lower frequency limit.

3. A circuit as claimed in claim 2 wherein said parallel and series capacitors having values of about 33 and 12 picofarads respectively, and said inductor has a value of about 0.37 microhenries.

4. A circuit as claimed in claim 1 wherein said series reactance element comprises an inductor and said resonant frequency is approximately equal to said upper frequency limit.

5. A circuit as claimed in claim 1 wherein said parallel capacitor comprises a feedthrough capacitor.

6. A circuit as claimed in claim 1 further comprising means for resonanting said output port to any frequency within said range comprising an inductor.

7. A circuit as claimed in claim 6 wherein said resonanting means further comprises a capacitor.

* * * * *